UNITED STATES PATENT OFFICE.

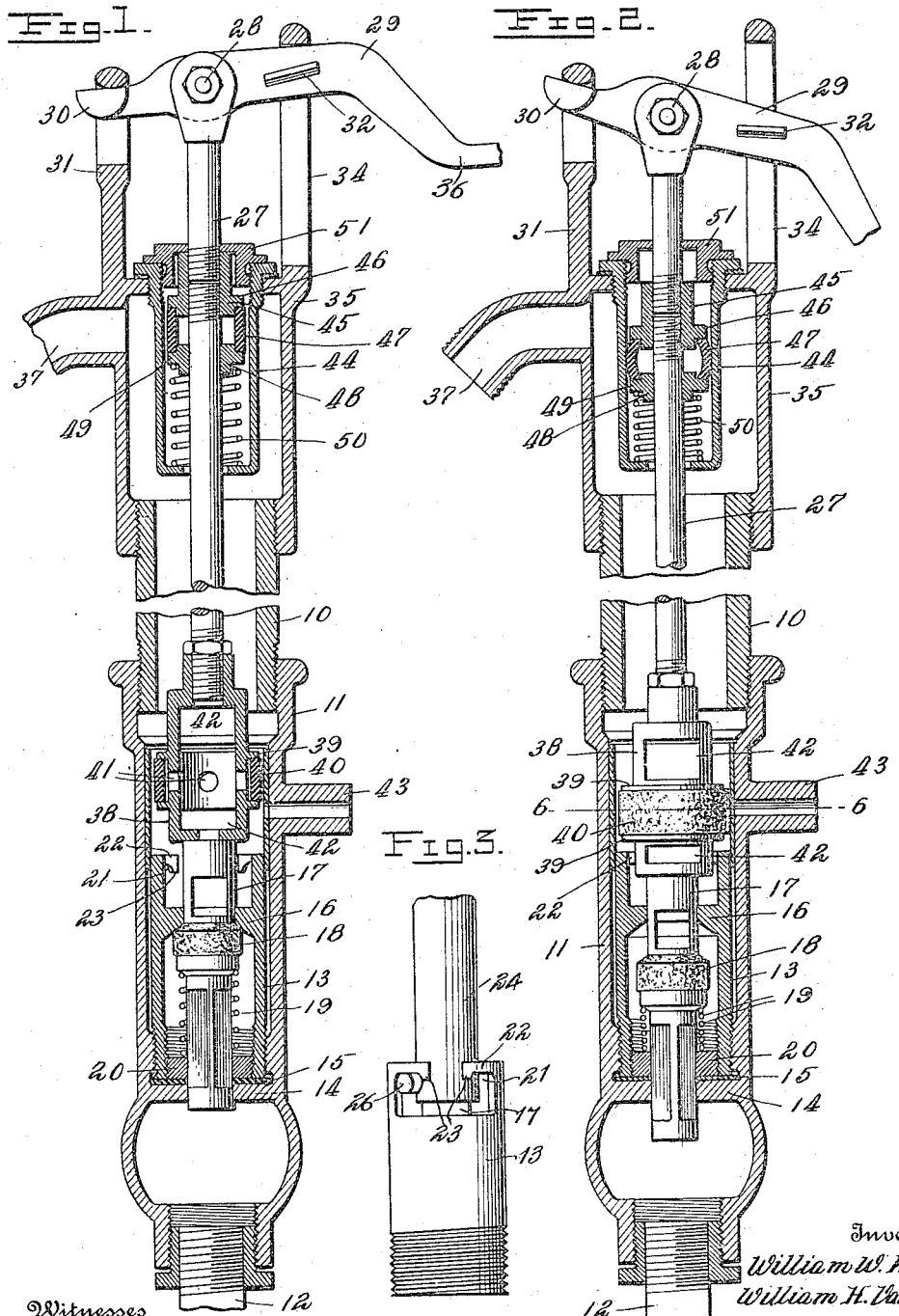

WILLIAM WALLACE KEMP AND WILLIAM HENRY VAN HORN, OF BALTIMORE, MARYLAND.

INLET AND WASTE VALVE.

1,124,455.  Specification of Letters Patent.  Patented Jan. 12, 1915.

Application filed May 23, 1914. Serial No. 840,520.

*To all whom it may concern:*

Be it known that we, WILLIAM WALLACE KEMP and WILLIAM H. VAN HORN, citizens of the United States, residing at Baltimore, in the State of Maryland, have invented new and useful Improvements in Inlet and Waste Valves, of which the following is a specification.

This invention relates to an improvement in inlet and waste valve mechanism adapted particularly for use with hydrants, closets and the like, located out of doors, and wherein it is necessary to close off the flow pipe and drain the same at a considerable distance below the surface level.

The invention has for an object to provide a device of this nature having a cage which carries the inlet valve, a spring to close the valve, a valve stem, and a valve seat; a cage which may be removably secured in the lower end of the flow pipe, and which may be detached and raised by a suitable tool to raise with the cage all of the valve parts, the valve seat, and to remove the spring and any parts of the spring which may accidentally become broken.

Another object of this invention is to combine with the inlet valve and its cage a waste valve which is carried upon the operating stem immediately above the inlet valve, and which is automatically closed by the pressure of the water passing up through the flow pipe when the inlet valve is opened.

Other objects and advantages of this invention will appear from the following detail disclosure of one embodiment of the invention, the same being illustrated in the accompanying drawings wherein,—

Figure 1 is a vertical section taken through the hydrant, the same being enlarged and broken away at its intermediate portion and showing the inlet valve closed. Fig. 2 is a similar view showing the inlet valve in its open position. Fig. 3 is a detailed view of the cage employed for carrying the inlet valve and its parts, the view showing the cage attached to a valve removing tool.

Referring to these drawings, wherein like parts are designated by similar characters of reference throughout the several views, 10 designates a flow pipe of any suitable length and construction, and to the lower end of which is attached a valve casing 11. The casing 11 is connected at its lower end to a supply pipe 12 through which water under pressure is conducted to the valve casing and flow pipe.

Detachably positioned in the casing 11 is a cage 13 externally screw-threaded preferably at its lower end, and engaging a correspondingly internally threaded portion within the lower end of the casing 11. The casing 11 has a seat 14 in its lower end upon which the cage 13 rests when in place, the seat 14 being in the form of a diaphragm having a central aperture therethrough. If desired a packing 15 may be placed upon the seat 14 between the same and the lower end of the cage 13.

The cage 13 comprises a cylindrical hollow body provided intermediate its ends with a downwardly facing valve seat 16 through the central opening of which operates a valve stem 17. The stem 17 carries a valve 18 fixed to the stem for movement therewith and normally held up against the seat 16 by a spring 19 coiled about the lower end of the stem 17. The cage 13 is provided with a removable bottom 20 preferably screw-threaded into the cage and having a central opening through which the lower end of the valve stem 17 passes, the bottom 20 serving as a guide for the lower end of the stem while the valve seat 16 constitutes a guide for the upper end of the stem 17. The lower end of the spring 19 rests upon the detachable bottom 20 and may be readily removed from the cage 13 upon the removal of the bottom. As may be best seen from Fig. 3, the upper end of the cage 13 is provided with opposed undercut slots 21 opening through the upper edge of the cage and providing between the slots 21 a pair of T-shaped arms 22. The outer ends of the arms 22 are preferably provided with downwardly extending lugs 23. The cage 13 is adapted to be passed down into the flow-pipe 10 and valve casing 11 by means of a tool 24, shown to advantage in Fig. 3. The tool 24 comprises an elongated rod provided at its lower end with a pair of opposed radially extending studs 26 adapted for engagement in the slots 21 between the ends of the T-arms 22, and adapted to bear against the undersides of the T-arms 22 and to be held in place by the lugs 23.

The valve stem 17 in the cage is of such length that when the valve 18 is seated, as shown in Fig. 1, the upper end of the valve stem 17 is located substantially in the plane of the upper edge of the cage 13. When the tool 24 is pressed down into the cage and interlocked with the T-arms the stem 17 is retracted against the tension of the spring 19, and the spring exerting a constant tension upon the tool 24 holds the studs 26 of the tool up against the T-arms 22 and behind the lugs 23 to prevent the accidental displacement of the studs. The cage is thus securely held upon the tool. The tool may be readily released from the cage by exerting sufficient downward pressure upon the tool to overcome the tension of the spring 19 and to move the studs down sufficiently to escape the lugs 23.

For the purpose of unseating the valve 18 and admitting water into the flow pipe 10, an operating stem 27 is employed. This stem 27 passes down through the flow pipe 10 for engagement with the operating parts of the valve 18 and is raised and lowered in any suitable manner, as by the mechanism shown in the accompanying drawings. From Figs. 1 and 2 of the drawings it will be noted that the upper end of the stem 27 is hinged, as by a bolt 28, to an operating lever 29. The lever 29 is provided at its forward end with a projection 30 extending into a transverse opening in the upper end of a fulcrum arm 31. The lever 29 is adapted to swing upon the upper end of the arm 31 in order to raise and lower the valve rod or operating stem 27. In rear of the bolt 28 the lever 29 is provided with a pawl or dog 32 arranged opposite to a vertically disposed rack 33 the teeth of which project inwardly from a vertically extending yoke 34 which is mounted upon the casing 35 at the top of the hydrant. The lever 29 is preferably offset downwardly as shown in Fig. 1 to provide a hand engaging portion or handle 36. The yoke 34 is of such width as to admit of a lateral swinging of the lever 29 therein whereby to engage and disengage the dog 32 from the teeth of the rack 33. It will be noted that the teeth of the rack 33 slope downwardly for the purpose of locking the lever 29 from upward movement under the tension of the inlet valve spring 19. It will be noted that the casing 35 at the top of the hydrant is provided at one side with a suitable outlet nozzle, or spout 37 through which the out flowing water is adapted to pass.

A hollow cylindrical frame 38 is mounted upon the lower end of the operating stem 27 and engages at its lower extremity against the upper end of the valve stem 17. The frame 38 is provided intermediate its ends with a pair of spaced apart flanges 39 confining therebetween a ring valve 40 loosely fitting within the valve casing 11 and between the flanges 39. The frame 38 has one or more apertures 41 in the sides thereof, communicating with the interior of the frame 38 and through which water is adapted to pass when flowing up through the valve casing. The opposite ends of the frame 38 are provided with lateral openings 42 through which the water passes when the inlet valve is opened. A waste outlet 43 is located at one side of the valve casing 11 in position to register with the ring valve 40 when the latter is depressed and the inlet valve 18 is opened.

The casing 35 at the top of the hydrant is provided with a rod packing, the same comprising a packing box 44 projecting down into the casing 35 about the rod 27, the packing box 44 having preferably external screw threads at its upper end engaging corresponding internal threads in the top of the casing 35. The operating stem or rod 27 is preferably made in two parts, the parts being joined by a sleeve or coupling 45 provided near its lower end with an outstanding flange 46 constituting a shoulder receiving thereagainst the upper end of a packing ring 47 which engages the lower end of the sleeve 45. The sleeve 45 is carried down with the rod 27 and thus forces the packing ring 47 down within the packing box 44.

A ring 48 is slidably mounted upon the rod or stem 27 below the sleeve 45, the ring 48 having an outstanding flange 49 constituting a shoulder adapted to receive the lower end of the packing ring 47, which latter engages at its lower end over the upper portion of the ring 48. A compression spring 50 surrounds the rod 27 within the box 44, the spring resting at its lower end upon the bottom of the box 44 and bearing at its opposite end against the lower side of the flange 49 of the sliding ring 48 to thereby normally press the ring toward the sleeve and thus bind the packing 47 against the wall of the box 44. A cap 51 is screwed into the upper end of the packing box 44 about the valve stem 27 to close the packing box 44. The cap 51 is preferably recessed in its underside to receive the upper end of the ring 45, the cap 51 constituting a stop limiting the upward movement of the sleeve 45 and rod 27 when raised under the tension of the spring 50.

From the above description taken in connection with the accompanying drawings, it will readily be seen that the parts of the hydrant normally assume the position shown in Fig. 1 wherein the inlet valve 18 is closed and the flow of water is cut off from the hydrant. When it is desired to open the hydrant the handle 36 is pressed down to swing the lever 29 about the fulcrum arm 31 and thus force the rod 27 down into the hydrant. This downward movement of the rod carries the sleeve or coupling member 45 down in the stuffing or packing box 44, compressing the packing 47 between the sleeve and the ring 48 to seal the operating rod or stem 27 within the packing box. As the rod moves down the spring 50 is compressed in the bottom of the box and caused to urge a greater tension upon the ring 48 and the packing 47, thus binding the packing tighter in the box and about the stem proportionately to the depression of the rod or stem 27.

The downward movement of the stem or rod 27 also forces the frame 38 against the valve stem 17 and overcomes the tension of the spring 19 to unseat the inlet valve 18. The water now flows from the supply pipe 12 into the casing 11 and about the lower end of the valve stem 17 into the cage 13. The fluid passes through the valve seat 16 and stem 17 into the hollow frame 38 and up into the flow-pipe 10 to the top of the hydrant. As the water passes up through the frame 38 it is forced through the openings 41 and, as the waste outlet 43 is at one side of the casing 11 moves the loose packing ring 40 over against the waste opening and binds the loose packing ring 40 over the opening to prevent the escape of the water into the waste outlet. It is of course understood that the downward movement of the rod 27 brings the waste valve 40 opposite to the outlet or waste opening 43. The water passes from the upper end of the hydrant about the packing box 44 and out through the nozzle or spout 37. The lever 29 may be moved laterally to engage the dog 32 with the rack 33 to hold the hydrant open and in the position shown in Fig. 2. When it is desired to close the hydrant the handle 36 may be moved away from the rack to release the lever 29 when the springs 19 and 50 are free to exert their tension on the spring 17 and the operating rod 27 to raise the same into normal closed position.

It will be noted that should any of the valve parts become broken or worn, or should it be desired to clean out the hydrant, all that is necessary is to remove the lever 29, stuffing box 44, and operating stem 27 with its parts, when the tool 24 may be passed down into the flow pipe 10 and engaged with the cage 13 as above described for the purpose of unscrewing the cage out of the lower casing and raising the cage with all of its valve parts. As the cage has a detachable bottom 20 the spring 19 and valve stem 17 may be quickly removed from the cage after it is raised out of the hydrant.

What is claimed is—

1. In a device as specified, a valve casing, a cage detachably mounted in said casing and having a valve seat therein, a detachable bottom in the cage, a spring resting on said bottom and engaging said valve to normally seat the same, and means for opening said valve at times.

2. A device as specified having a casing, and a cage detachably mounted in the casing, said cage having a valve seat in its upper end, a detachable bottom in its lower end, a valve stem passing through said valve seat and said bottom, a valve on said stem, a spring in said cage between said bottom and said valve adapted to normally seat the valve and means for depressing said stem to open said valve.

3. In a device as specified, a casing, a cage detachably mounted in the casing and adapted to be removed through the top thereof, said cage having a valve seat therein, a valve in the cage, a spring inclosed within the cage engaging said valve to normally seat the same and adapted to be removed with the cage, and means for opening said valve at times.

4. In a device as specified, a casing, a cage detachably mounted in the casing and adapted to be secured and removed therefrom by a suitable tool, a valve seat in the cage, a valve in the cage, a spring inclosed in said cage for normally seating the valve, an operating rod for unseating the valve, and a waste valve on said rod adapted to close on the unseating of said first valve.

5. In a device as specified, a cage adapted for insertion in a valve casing and having a valve seat therein, a detachable diaphragm in said cage, a valve stem mounted for longitudinal movement through the valve seat and the diaphragm, a valve on said stem, and a spring between said diaphragm and said valve adapted to normally seat the valve.

6. In a device as specified, a casing having a waste port at one side, a cage detachably mounted in the casing and having a valve seat therein, a valve in the cage, a spring engaging the valve to normally seat the same, a diaphragm detachably mounted in the cage for engagement with said spring and to inclose the same in the cage, an operating rod projecting down into the casing, a frame on said rod adapted to unseat said valve, and a waste valve on said frame adapted to close said waste port upon the opening of said first valve.

7. In a device as specified, a casing having a diaphragm in its lower end with an aperture therethrough, a cage detachably positioned in the casing and resting on said diaphragm, a detachable bottom in said cage having an aperture therethrough, a valve seat in the cage, a valve in the cage, a stem for said valve movable through said seat and said bottom and projecting through the aperture in said diaphragm, a spring surrounding said stem between said bottom and the valve whereby to normally seat the valve, and an operating rod projecting into the casing and engaging said stem adapted to open said valve.

8. In a device as specified, a casing, a cage in said casing, a pair of T-arms projecting upwardly from said cage and adapted to receive the lateral projections of a valve removing tool, a stem in said cage, a valve seat in said cage, a valve on said stem, a spring in said cage engaging the valve to normally seat the same and hold said stem upwardly, said stem being adapted to engage said tool whereby to yieldingly hold the lateral projections of said tool against said T-arms, and a removable bottom mounted in said cage for inclosing said spring therein.

9. A device as specified comprising a casing, a cage detachably mounted in the casing, said cage having a valve seat near its upper end, a detachable bottom mounted in the cage, a valve stem mounted for reciprocation through the valve seat and said bottom, a valve on said seat, a spring in the cage interposed between said bottom and said valve adapted to normally seat the valve, an operating rod adapted for movement longitudinally in the casing, a frame carried upon the lower end of the rod for engagement with said valve stem whereby to depress the same upon the movement of the rod, said casing having a waste port at one side, and a valve carried upon said frame adapted to close said port upon the downward movement of the frame.

10. In a hydrant, a flow-pipe, a casing mounted on the pipe, a detachable cage carried in the casing, an inlet valve mounted in the cage, a spring in the cage normally seating said valve, an operating rod projecting down through the flow-pipe and engaging said valve, a waste outlet in said casing, a waste valve carried upon said operating rod, and means for moving said rod whereby to open said inlet valve and close said waste valve.

11. In a device as specified, a valve cage having a valve seat therein, a detachable bottom in the cage, a valve stem movable through said seat and said bottom, a valve on said stem, a spring interposed between said bottom and said valve, adapted to normally seat the valve and retain said stem in a raised position, said cage having opposed undercut slots in its opposite sides adapted to receive the lateral projections of a valve removing tool, said stem being adapted for yielding engagement with said valve removing tool to hold the same by the tension of said spring, and lugs on said cage projecting into the open ends of the slots for engagement with said lateral projections of the tool whereby to confine the same in said undercut slots.

In testimony whereof we have hereunto set our hands in presence of two subscribing witnesses.

WILLIAM WALLACE KEMP.
WILLIAM HENRY VAN HORN.

Witnesses:
EDGAR J. KEMP,
JERE B. JONES.

Copies of this patent may be obtained for five cents each, by addressing the "Commissioner of Patents, Washington, D. C."